US007046280B1

(12) United States Patent
Niikawa

(10) Patent No.: US 7,046,280 B1
(45) Date of Patent: May 16, 2006

(54) IMAGE PROCESSING SYSTEM, METHOD FOR FORMATTING RECORDING MEDIUM, AND PROGRAM PRODUCT

(75) Inventor: Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/291,195

(22) Filed: Apr. 14, 1999

(30) Foreign Application Priority Data

Apr. 17, 1998 (JP) ................................ 10-108201

(51) Int. Cl.
*H04N 5/76* (2006.01)
*H04N 5/225* (2006.01)
*H04N 5/232* (2006.01)
*H04N 5/222* (2006.01)

(52) U.S. Cl. .............................. 348/231.9; 348/211.14; 348/207.1; 348/333.02

(58) Field of Classification Search ............ 348/207.1, 348/207.11, 211.14, 231.9, 231.7
See application file for complete search history.

(56) References Cited

U.S. PATENT DOCUMENTS

| 5,477,264 | A |   | 12/1995 | Sarbadhikari et al. |        |
|-----------|---|---|---------|---------------------|--------|
| 5,479,206 | A |   | 12/1995 | Ueno et al.         |        |
| 5,606,420 | A | * | 2/1997  | Maeda et al.        | 358/296 |
| 5,648,816 | A | * | 7/1997  | Wakui               | 348/231.9 |
| 5,742,339 | A | * | 4/1998  | Wakui               | 348/231.9 |
| 5,809,520 | A | * | 9/1998  | Edwards et al.      | 711/115 |
| 5,861,918 | A | * | 1/1999  | Anderson et al.     | 348/231.9 |
| 5,926,208 | A | * | 7/1999  | Noonen et al.       | 348/14.13 |
| 6,070,208 | A | * | 5/2000  | Brief               | 710/104 |
| 6,208,380 | B1 | * | 3/2001 | Misawa              | 348/231.9 |
| 6,239,837 | B1 | * | 5/2001 | Yamada et al.       | 348/231.5 |
| 2001/0011328 | A1 | * | 8/2001 | Chung           | 711/128 |
| 2002/0149676 | A1 | * | 10/2002 | Hatori          | 348/207.1 |
| 2002/0191089 | A1 | * | 12/2002 | Ikeda           | 348/231.7 |
| 2003/0025808 | A1 | * | 2/2003 | Parulski et al. | 348/231.99 |
| 2003/0038880 | A1 | * | 2/2003 | No              | 348/207.1 |
| 2003/0128283 | A1 | * | 7/2003 | Watanabe et al. | 348/231.9 |

FOREIGN PATENT DOCUMENTS

| JP | 07-023913 |   | 1/1995 |
|----|-----------|---|--------|
| JP | 08-123585 |   | 5/1996 |
| JP | 08-223526 | * | 8/1996 |
| JP | 09-083522 |   | 3/1997 |
| JP | 09-098378 |   | 4/1997 |
| JP | 10-093807 |   | 4/1998 |

OTHER PUBLICATIONS

English translation of JP 08-223,526 Wakui Yoshio.*
Microsoft Computer Dictionary, Fifth Edition, Microsoft Corporation, 2002, pp. 111 and 424.

* cited by examiner

*Primary Examiner*—Ngoc-Yen Vu
*Assistant Examiner*—James M. Hannett
(74) *Attorney, Agent, or Firm*—Buchanan Ingersoll PC

(57) ABSTRACT

An image processing system includes a photographing apparatus, and an image processing apparatus to which the photographing apparatus and a recording medium can be connected. The photographing apparatus includes a controller for executing a program recorded in the recording medium. The image processing apparatus includes a processor for creating a region accessible from the photographing apparatus, and a controller for causing the program to be stored in the region.

15 Claims, 12 Drawing Sheets

IMAGE PROCESSING SYSTEM, METHOD FOR FORMATTING RECORDING MEDIUM, AND PROGRAM PRODUCT

The present invention claims priority based on Japanese Patent Application Serial No. H10-108201, the contents of which are incorporated hereinto by reference in its entirety.

BACKGROUND OF THE INVENTION

1. Field of the Invention

This invention relates to an image processing system including a photographing apparatus, such as a digital camera, and an image processing apparatus, such as a personal computer (PC), to which the photographing apparatus is connected, a method for formatting a recording medium and a program product. The photographing apparatus photoelectrically converts an optical image of a still object into image data, provides image processing if necessary, and record the image data in a recording medium.

2. Description of the Related Art

In general, image data photographed by a digital camera is taken into a computer by image take-in software (i.e., driver software), and then the image data is processed, printed, or recorded using an application software of the computer.

However, since the image data taken by the digital camera is taken in the computer first, and then the image data is processed using the application software of the computer in the conventional system, the operations of the digital camera and the computer are independent of each other with little cooperativity between the digital camera and the computer.

To overcome this problem, a digital camera which is capable of processing photographed image data by itself without relying on a computer has been proposed.

However, in this case, the digital camera needs a large capacity of memory in order to process the photographed image data. Consequently, the power consumption of the camera increases, and in addition, the size of the digital camera inevitably becomes large, which results in an increased manufacturing cost.

Meanwhile, recent improvement in the performances of computers, especially in personal computers, is remarkable, and a so-called multitask process has been becoming popular. For this reason, not too much load is imposed on the computer side even if the digital camera is connected to the computer, and the computer sources are used by the digital camera to execute the operation for the digital camera itself.

SUMMARY OF THE INVENTION

Therefore, it is an object of the present invention to provide an image processing system which allows a photographing apparatus, such as a digital camera, to execute a specific process generally requiring a large memory capacity without providing an extra memory to the photographing apparatus.

It is another object of the present invention to provide a method for formatting a recording medium suitable to this image processing system.

It is still another object of the present invention to provide a program product suitably used in the image processing system.

In order to achieve these objects, in one aspect of the present invention, an image processing system including a photographing apparatus and an image processing apparatus to which the photographing apparatus and a recording medium can be connected is provided. The photographing apparatus comprises a controller for executing a program stored in the recording medium. The image processing apparatus comprises a processor for creating an region accessible from the photographing apparatus, and a controller for causing the program to be stored in the region.

With this image processing system, the photographing apparatus can access a predetermined region created in the recording medium, and can refer to the data stored in that region. Accordingly, a specific operation for the photographing apparatus can be executed by making use of the region. In other words, the recording medium, which is the source of the image processing apparatus, can be used for data processing for the photographing apparatus.

Preferably, the image processing apparatus has an indicator for issuing a warning when the image processing apparatus is to be shut down during the access to the recording medium by the photographing apparatus. The user can recognize that the photographing apparatus is currently referring to the region.

Preferably, the photographing apparatus has an interface for connecting the photographing apparatus to the image processing apparatus. A buffer memory is preferably provided to the interface. In this case, the data which is to be transmitted from the photographing apparatus to the image processing apparatus can be temporarily stored in the buffer memory.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

Figure 1:
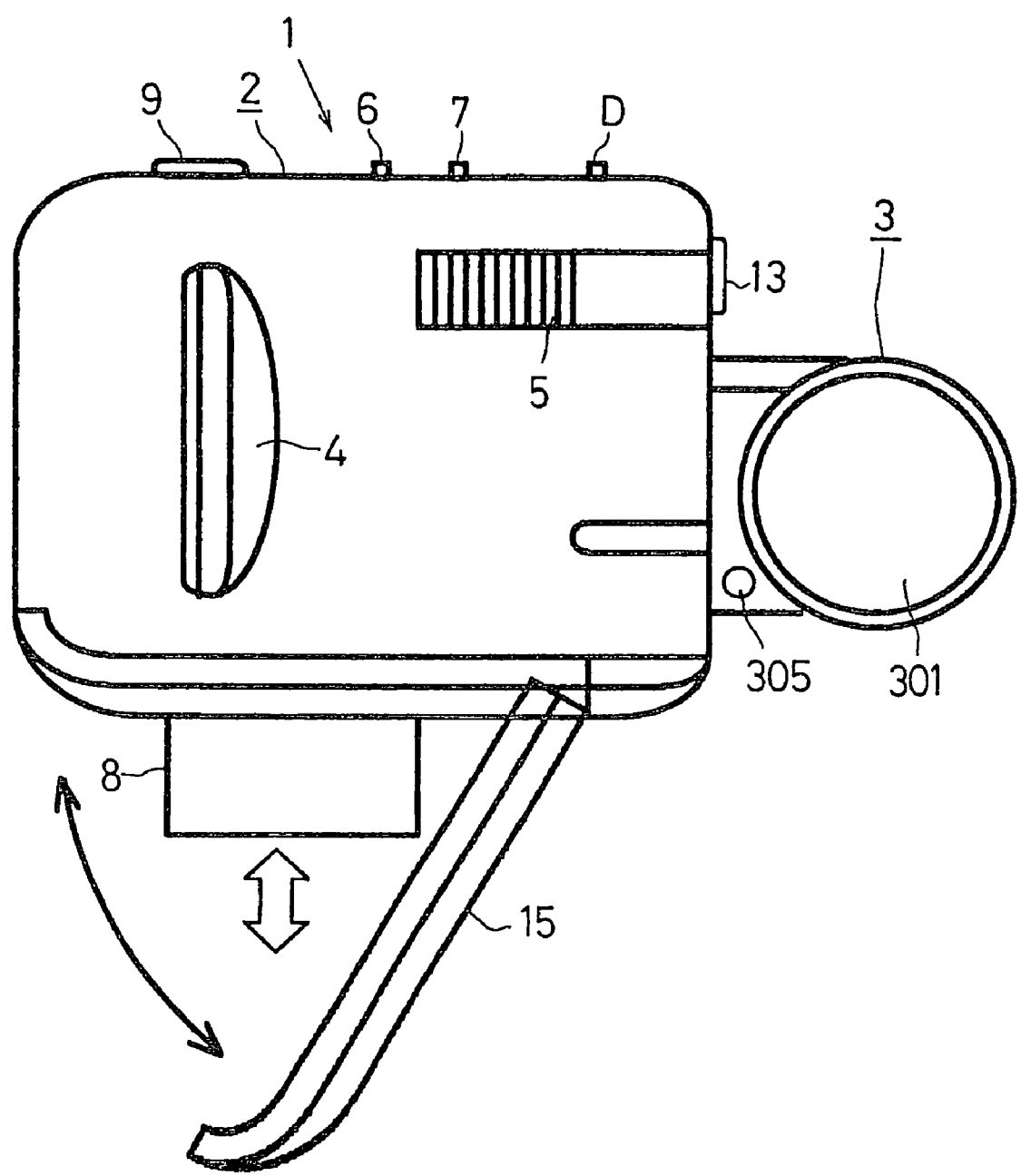
FIG. 1 is a front view of a digital camera used in an image processing system according to one embodiment of the present invention.
Figure 2:
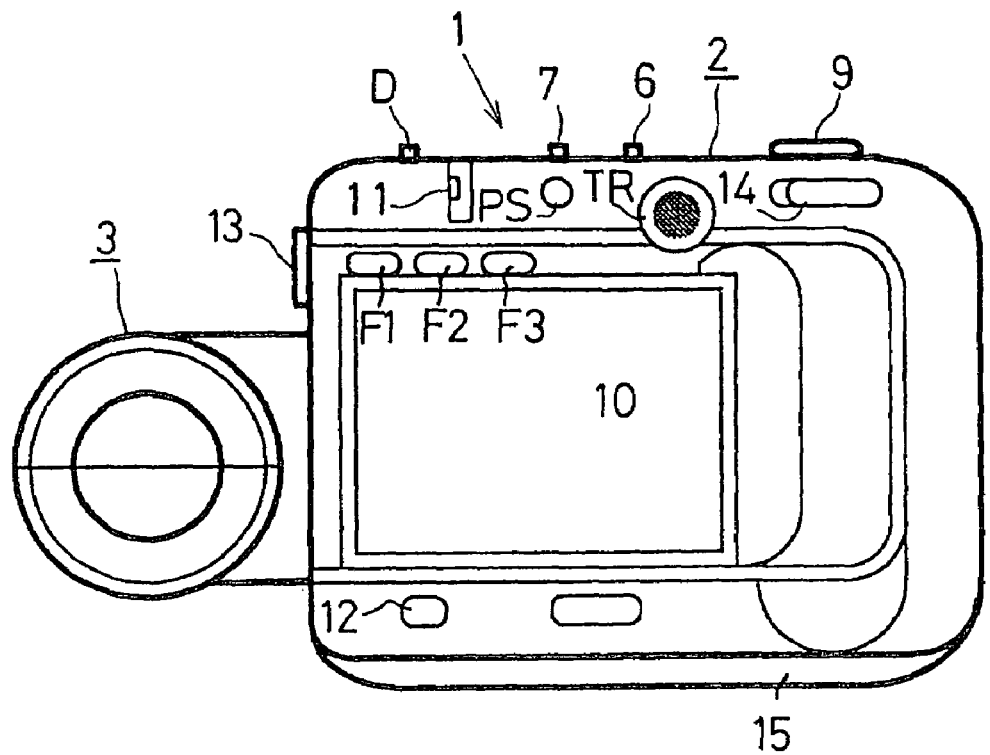
FIG. 2 is a rear view of the digital camera.
Figure 3:
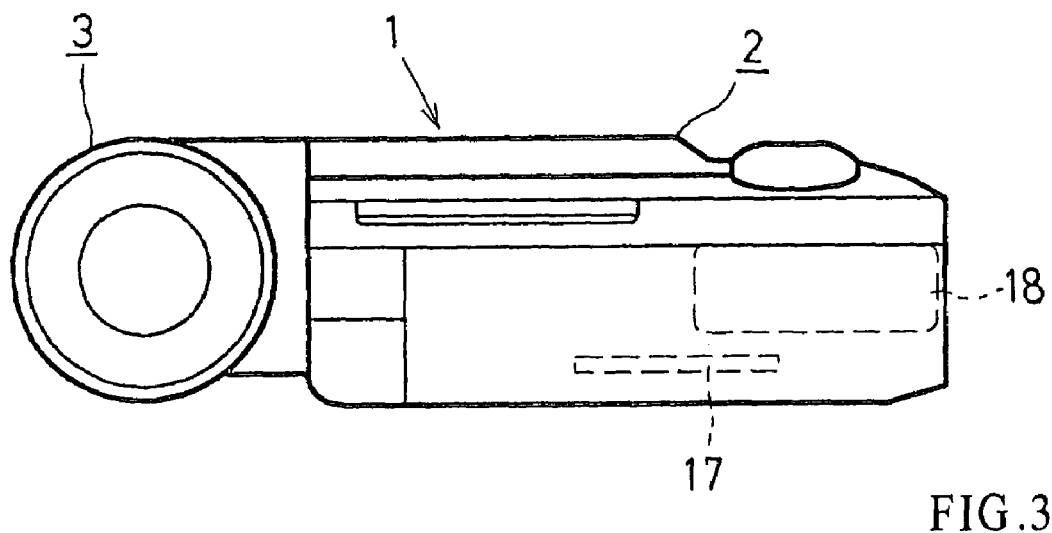
FIG. 3 is a bottom view of the digital camera.

FIGS. 1–3 illustrate a digital camera as a photographing apparatus used in a network system according to one example of the present invention.

The digital camera 1 comprises a camera frame, which is referred to as a main body 2, and a photographing unit 3 which is attachable to and removable from the main body 2 on the right side of the main body 2 in the front view shown in FIG. 1. The photographing unit 3 is pivotable within a plane parallel to the right side of the main body 2.

The photographing unit 3 has an image pick-up device comprising a zoom lens 301 and a photoelectric conversion device such as a CCD (Charge Coupled Device) array, to convert the optical image of an object into an electric image consisting of charge signals, each of which was generated by each pixel of the CCD via photoelectric conversion. The main body 2 has a display or LCD (Liquid Crystal Display) 10, a slot 17 for receiving a memory card 8, and a connection terminal 13 for connecting the digital camera to the outside apparatus. The image signal taken by the photographing unit 3 is subjected to a prescribed image processing in the main body 2. The processed image is displayed on the LCD display 10, recorded into the memory card 8, or transferred to the PC.

A zoom lens 301 is provided in the photographing unit 3. An image pick-up circuit including a CCD color area sensor 303 is located at an appropriated position behind the zoom lens 301. A light adjusting circuit 304 having a photo sensor 305 for receiving flash light reflected from the object is provided at an appropriated position in the photographing unit 3.

As shown in FIG. 1, a grip 4 is formed in the left-hand side of the front face of the camera main body 2, and a built-in flash device 5 is provided in the right-hand upper side at an appropriate position. Frame forward and backward switches 6 and 7 are provided near the center of the top face of the main body 2 as shown in FIG. 2. The forward switch 6 feeds the frame in the direction that the frame number increases in the photographed order, and is referred to as an UP key 6. The backward switch 7 feeds the frame in the direction that the frame number decreases, and is referred to as a DOWN key 7. A delete key D for deleting the images recorded in the memory card 8 is provided on the left of the DOWN key 7, and a shutter button 9 is provided on the right of the UP key 6 in the rear view shown in FIG. 2.

As shown in FIG. 2, an LCD 10 is provided in the middle of the left-hand side of the rear face of the camera main body 2. The LCD 10 functions as a view finder during photographing, and as a display during the reproduction of the recorded image. A compression rate setting slide switch 12 for switching the compression rate K of the image date to be recorded in the memory card 8 is positioned below the LCD 10. A USB (Universal Serial Bus) connection terminal 13 is positioned on the side face of the main body 2 near the photographing unit 3. A power switch PS is provided on the top of the rear face of the main body 2.

Further, a trackball TR used as a cursor direction means for the LCD 10 is provided at the right-upper side of the LCD 10. Provided at upper side of the LCD are function keys F1, F2 and F3 for executing a set specific function. Each function key enables to select and register the action when the key is pressed, and the registered content is stored in a nonvolatile memory (not shown) in the general controller 211.

The flash device (which may be abbreviated as FL) of the digital camera 1 has an "automatic flash mode", a "forcible flash mode", and a "flash prohibition mode". In the "automatic flash mode", the built-in flash device 5 automatically emits flash light according to the luminance of the object. In the "forcible flash mode", the built-in flash device 5 forcibly emits flash light regardless of the luminance of the object. In the "flash prohibition mode", light emission of the built-in flash device 5 is prohibited. Every time the user presses the FL mode setting key 11 positioned above the LCD 10 on the rear face of the main body 2, the flash mode is switched among three modes in a cyclic order. The digital camera 1 has a 1/8 compression rate and a 1/20 compression rate, and the user can select the preferred compression rate K. For example, if the compression rate setting switch 12 is shifted to the right, the compression rate K is set to 1/8, and if it is shifted to the left, the compression rate K is set to 1/20. Although, in this embodiment, the compression rate K is set to two values, it may be set to three or more values.

A photographing/reproduction mode setting switch 14 is positioned at the top right of the rear face of the main body 2. Digital pictures are taken in the photographing mode. In the reproduction mode, the digital images recorded in the memory card 8 are reproduced and displayed on the LCD 10. The photographing/reproduction mode setting switch 14 is also a bicontact slide switch. For example, if the switch is shifted to the right, the reproduction mode is selected, and if shifted to the left, the photographing mode is selected.

The FL mode setting switch 11, the UP key 6, the DOWN key 7 and the shutter button 9 comprise a push key, respectively.

A card insertion slit 17 for receiving the memory card 8 and a battery cavity 18 are positioned on the bottom face of the main body 2. The slit 17 and the battery cavity 18 are covered with a clam-shell type cover 15. The digital camera 1 is loaded with a power supply source E consisting of four AA batteries connected in series.

Figure 4:
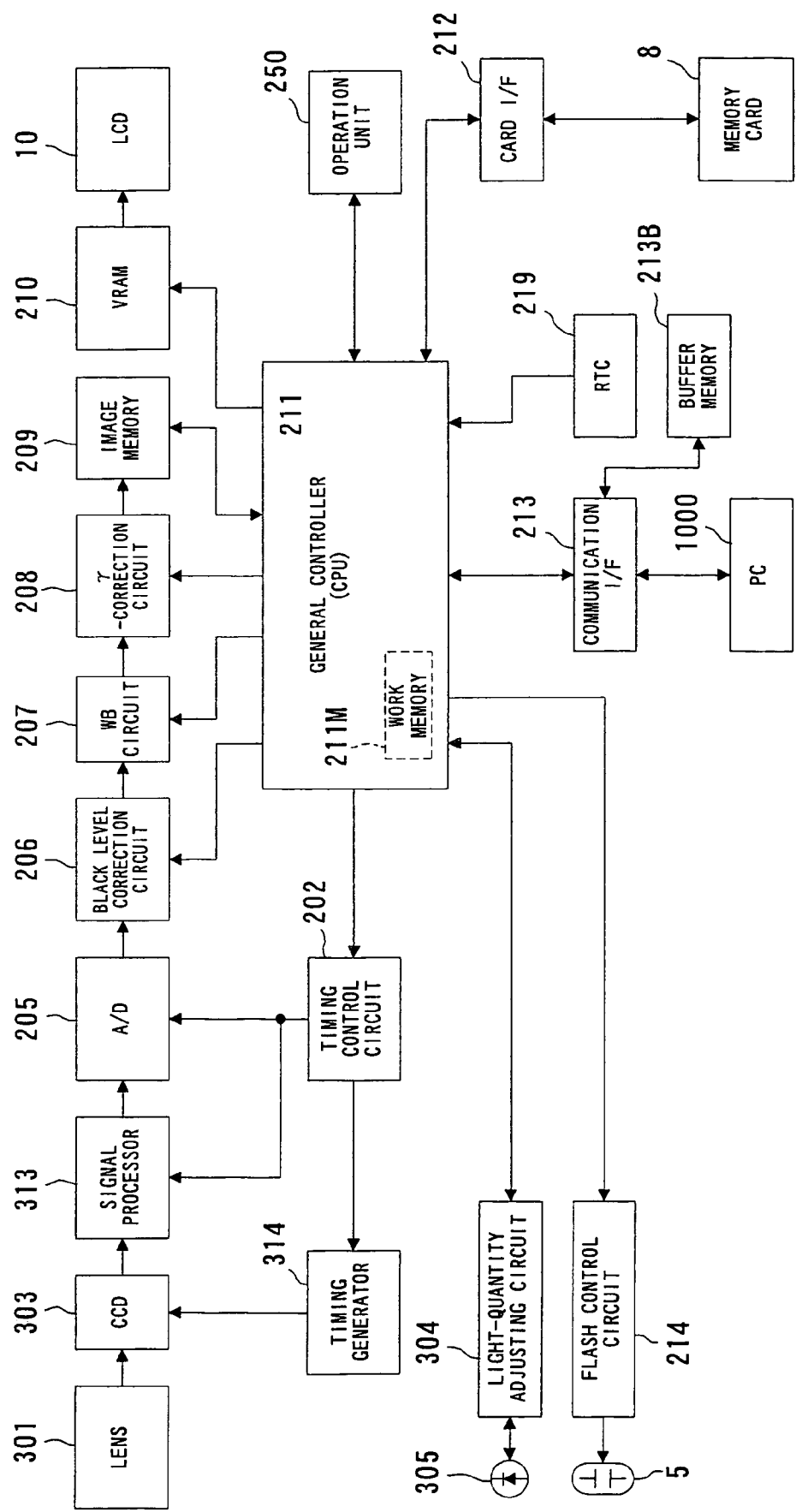
FIG. 4 is a block diagram showing the electrical structure of the digital camera.

FIG. 4 is a block diagram of the control system of the digital camera 1.

The CCD 303 in the photographing unit 3 photoelectrically converts the optical image of the object focused by the zoom lens 301 into image signals of three color components R (red), G (green) and B (blue), and outputs the image signals to the signal processor 313. This image signal consists of sequence of pixel signals received by the respective pixels. A timing generator 314 generates various timing pulses for controlling and driving the CCD 303.

Since the diaphragm of the photographing unit 3 is fixed, the exposure of the photographing unit 3 is controlled by adjusting the quantity of exposure of the CCD 303, that is, the charge accumulation time of the CCD 303, which correspond to the shutter speed. If the luminance of the object is too low to select to an appropriate shutter speed, the level of the image signal output from the CCD 303 is adjusted in order to compensate for the insufficient exposure. In other words, at a low luminance, the exposure is controlled by adjusting both the shutter speed and the gain. The level of the image signal is adjusted by controlling the gain of the AGC circuit in the signal processor 313.

The timing generator 314 generates various driving control signals for the CCD 303 based on the reference clock supplied from the timing control circuit 202. The signals generated by the timing generator 314 includes a timing signal for starting and finishing integration (i.e., exposure), and clock signals (horizontal synchronization signals, vertical synchronization signals, transfer signals, etc.) for controlling the reading timing of the light-receiving signals from the respective pixels. These timing signals are supplied to the CCD 303.

The signal processor 313 applies prescribed analogue signal processing to the analog image signal output from the CCD 303. The signal processor 313 has a CDS (correlation double sampling) circuit for reducing the noise of the image signal and an AGC (automatic gain control) circuit for adjusting the level of the image signal by controlling the gain of this AGC circuit.

The light-quantity adjusting circuit 304 controls the light emission of the built-in flash device 5 to a predetermined level determined by the general controller 211 when the flash device is used during the photographing. During the flash photographing, the flash light reflected from the object is received by the photo sensor 305 upon starting exposure. When the quantity of light received by the sensor 305 reaches a predetermined level, the light-quantity adjusting circuit 304 supplies a flash stop signal to the flash control circuit 214 via the general controller 211. In response to the flash stop signal, the flash control circuit 214 stops the light emission of the built-in flash device 5, whereby the light emission amount of the built-in flash device 5 can be regulated to the prescribed level.

The A/D converter 205 provided in the main body 2 of the digital camera 1 converts each pixel signal (i.e., analog signal) of the image signal sequence into a 10-bit digital signal based on the A/D conversion clock supplied from the A/D clock generator (not shown).

A reference clock/timing generator 314 and a timing control circuit 202 are also provided in the main body 2. The timing control circuit 202 is controlled by the general controller 211, and generates a clock for the A/D converter 205.

A black level correction circuit 206 corrects the black level of the digitalized pixel signal (hereinafter referred to as pixel data) converted by the A/D converter 205 to the reference black level. A white balance circuit (hereinafter referred to as WB circuit) 207 converts the level of the pixel data of each color component of R, G or B, so that the white balance can be adjusted after γ (gamma) correction. The WB circuit 207 converts the level of the pixel data of each color component R, G, B using a level conversion table input from the general controller 211. The conversion coefficient (or the slope of the characteristic line) for each color component in the level conversion table is set each photographed image by the general controller 211.

The γ correction circuit 208 corrects for the γ characteristic of the pixel data. The γ correction circuit 208 has, for example, six γ correction tables with different γ characteristics, and uses the most appropriate γ correction table according to the photographed scene or the photographic conditions.

An image memory 209 stores the pixel data output from the γ correction circuit 208. The memory capacity of the image memory 209 corresponds to one frame data. Accordingly, if the CCD 303 has an n×m pixel matrix, the image memory 209 has a memory capacity of n×m pixel data, and each pixel data is stored in the corresponding pixel position in the memory.

A VRAM 210 is a buffer memory for storing the image data which is to be reproduced and displayed on the LCD 10. The VRAM 210 has a memory capacity corresponding to the number of pixels to be photographed by the CCD 10.

In the photographing preparation mode, each pixel data of the image taken by the photographing unit 3 every 1/30 seconds is subjected to the prescribed signal processing by the sequence from the A/D converter 205 to the γ correction circuit 208, and stored in the image memory 209. This pixel data is simultaneously transferred to the VRAM 210 via the general controller 211, and displayed on the LCD 10. The user can see the photographed object (live-view image) on the LCD 10. In the reproduction mode, the image read out from the memory card 8 is subjected to the prescribed signal processing by the general controller 211, which is then transferred to the VRAM 210, and displayed on the LCD 10.

A card I/F 212 is an interface for writing and reading image data into and from the memory card 8. A communication I/F 213 is an interface based on, for example, the USB standard, or an interface for communication for externally connecting the PC 1000. A transmitting buffer memory 213B is connected to the communication I/F 213. When data is transmitted to the PC 1000, the data is first stored in the buffer memory 213B and then transmitted to the PC 1000 every capacity unit of the buffer memory 213B. Therefore, even if the digital camera 1 is disconnected from the PC 1000 and then reconnected thereto, it is possible to continuously process the data immediately after the disconnection by re-transmitting the data stored in the buffer memory 213B to the PC 1000.

A flash control circuit 214 controls light emission of the built-in flash device 5. In particular, the flash control circuit 214 controls the quantity of flash light, flash timing, and so on, based on the control signal supplied from the general controller 211. The flash control circuit 214 also brings the light emission to zero based on the flash stop signal STP input from the light-quantity adjusting circuit 304.

An RTC (Real Time Clock) 219 is a time circuit for keeping the track of the date and time of each photograph, which is driven by a separate power source (not shown).

An operation unit 250 is an I/F for the general controller 211 and includes the UP key 6, the DOWN key 7, the shutter button 7, the FL mode setting key 11, the compression rate setting key 12, and the photographing/reproduction mode setting switch 14 and the like.

The general controller 211 is composed of a microcomputer, and it organically controls the driving timing of each element in the photographing unit 3 and the main body 2 so as to generally control the photographing operation of the digital camera 1. Further, as will be explained later, the general controller 211 also executes a predetermined process or controls the data transmitting or receiving when the digital camera 1 is connected to the PC. In addition, the general controller 211 is provided with a work memory 211M which is required to execute an application for the digital camera.

If, in the photographing mode, the shutter button 9 is pressed to start photographing, the general controller 211 creates tag information (such as the frame number, exposure value, shutter speed, compression rate K, photographing date and time, flash ON/OFF data, scene information, image determination result, etc), store the tag information in the memory card 8, together with the thumbnail image created from the image taken in the image memory 209 after the start of the photographing operation, and the compressed image created by a JPEG method at a predetermined compression rate K.

Figure 5:
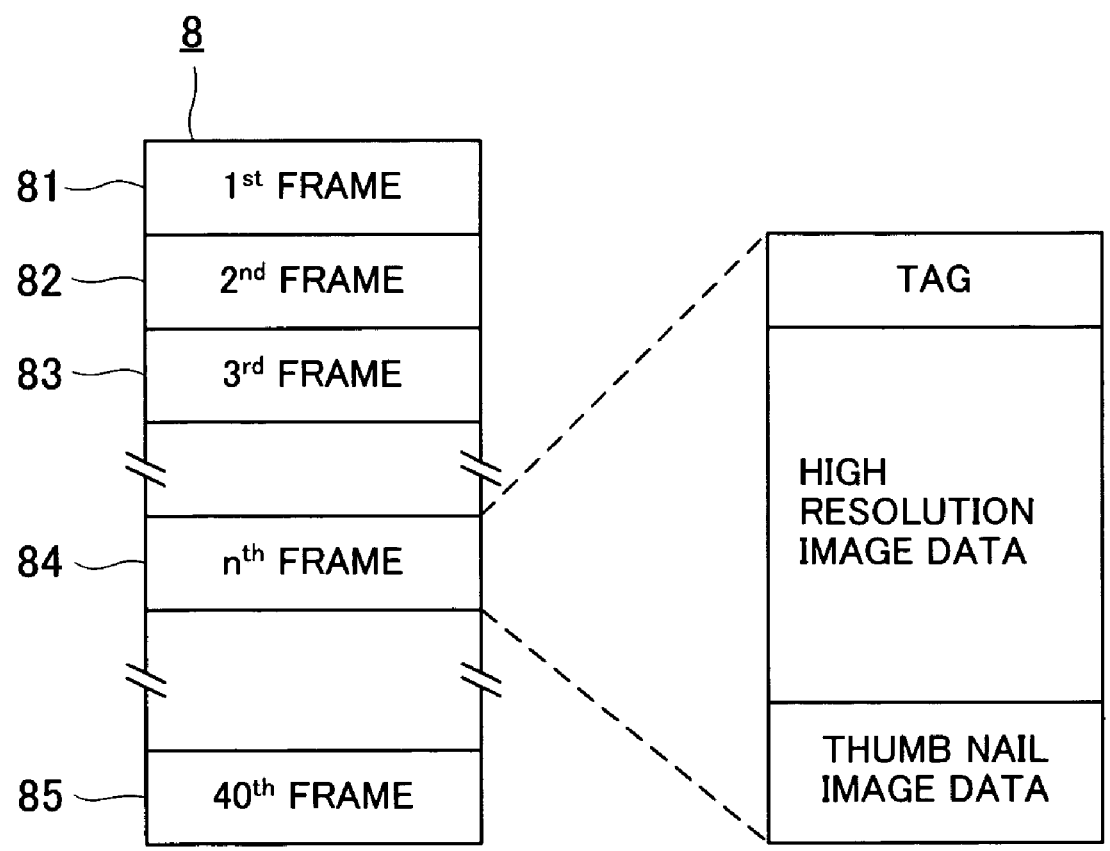
FIG. 5 illustrates an example of the data arrangement in the memory card used in the digital camera.

As shown in FIG. 5, the memory card 8 can store 40 (forty) frames of images taken by the digital camera 1 at a compression rate of 1/20. Each of the frames 81–85 has tag information, high-resolution image data (640×480 pixels) compressed by a JPEG method, and thumbnail image data (80×60 pixels). Each frame may be treated as an image file of, for example, an EXIF format.

Figure 6:
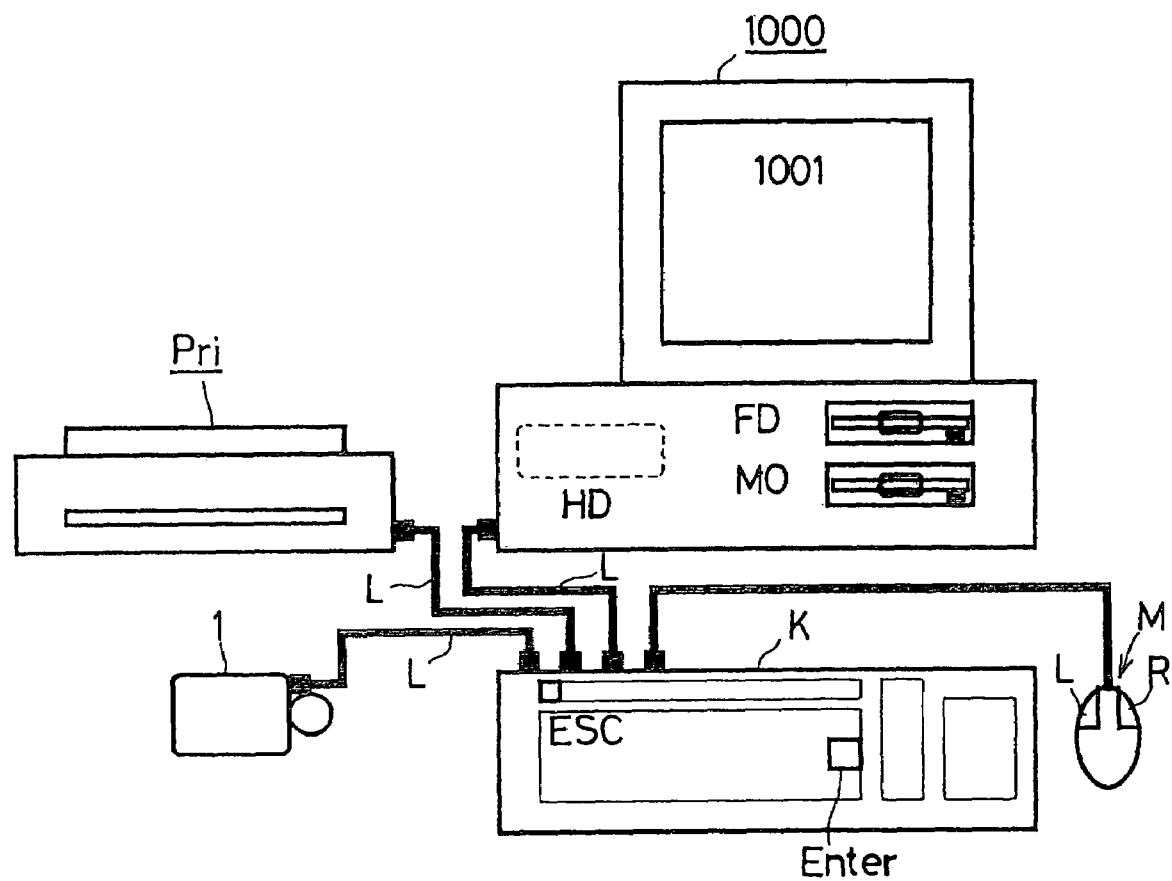
FIG. 6 illustrates an example of the system arrangement including the digital camera.

FIG. 6 illustrates the image processing system using the digital camera 1 according to an embodiment of the present invention.

This system includes a personal computer (PC) 1000, which functions as an image processing apparatus. A Keyboard (K) having a return key (ENT) and an escape key (ESC) is connected to the main body of the PC 1000. A mouses M1, a printer (Pri), and the digital camera 1 are connected to the keyboard (K) via the corresponding USB cables (L). The keyboard K also functions as a USB interface. The PC 1000 has a hard disc drives HD, in which the operating system and the application programs of the PC 1000 are installed. A floppy disk drive FD and a magneto-optic disk drive MO are provided to the PC 1000 so that floppy diskettes FD and magneto-optic discs MO, which are removable recording media, can be used in the PC 1000. The removable recording media are not limited to the floppy diskette FD and the magneto-optic disk MO. An execution program for the digital camera connecting application A is installed in the hard disc drive HD of the PC 1000 in advance. The execution program for the digital camera connecting application A may be installed by a recording medium such as a magneto-optic disc or a floppy diskette, in which this program is recorded.

Figure 7:
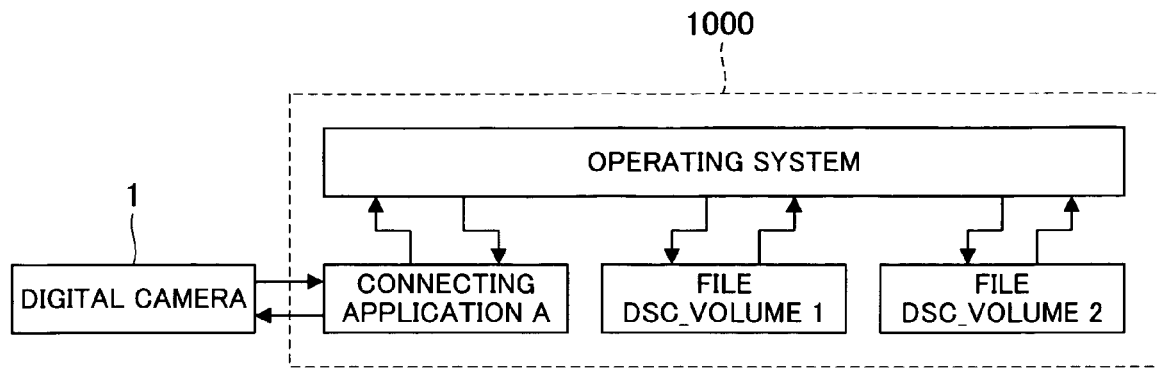
FIG. 7 illustrates the structure of the software used in the system shown in FIG. 6.

FIG. 7 illustrate the software structure of the image processing system shown in FIG. 6.

The control software of the digital camera 1 is activated by turning on the power source of the digital camera 1. At this time, the operating system has already been activated in the PC 1000. The operating system controls basic inputs and outputs of the PC 1000, and accordingly, the hard disc drive HD, the floppy diskettes FD, the magneto-optic disc MO, and the files created or recorded in these media are under the control of the operating system.

If the connecting application A is executed, a file having a file name "DSC_Volume1" is created in the hard disk drive HD under the control of the operating system. However, if the same file is already in the hard disk drive, this file is not created. This file is exclusively used by the digital camera 1 connected to the PC 1000.

Figure 8:
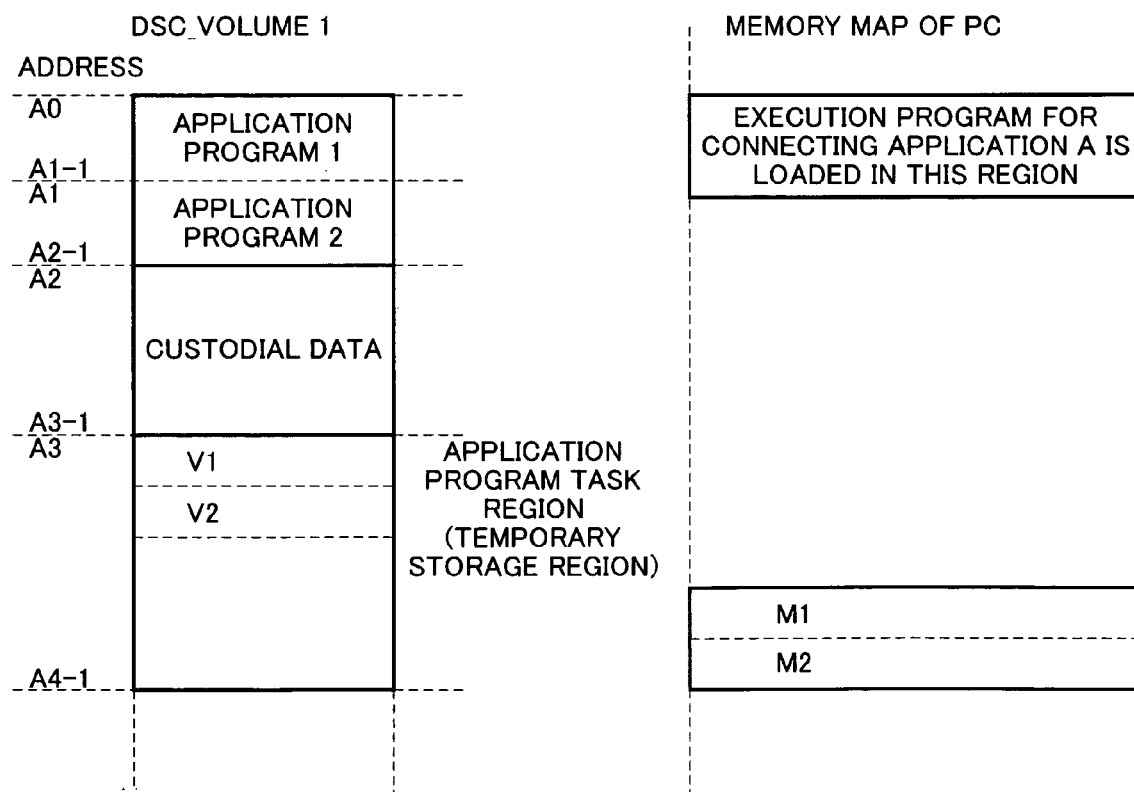
FIG. 8 illustrates an example of the file structure in the recording medium of the personal computer.

FIG. 8 illustrates the file structure of DSC_Volume 1. The addresses A0 through A1-1 store a dedicated application program 1, such as an image transformation program for converting a longitudinal image to a lateral image or vice versa, executed by the digital camera 1. The image transformation process will be described later in more detail. The addresses A1 through A2-1 store another application program 2.

The addresses A2 through A3-1 comprise a region for keeping the data of the digital camera 1, and the addresses A3 through A4-1 comprises a region which is temporarily used as a task region during the execution of the above-mentioned application program.

A file named "DSC_Volume2" is also simultaneously created in the magneto-optic disk, and its file structure is similar to that shown in FIG. 8. The file sizes of DSC-Volume1 and DSC-Volume2 regarded from the operating system may be arbitrarily set by the connecting application A.

Figures 9, 9A, 9B:
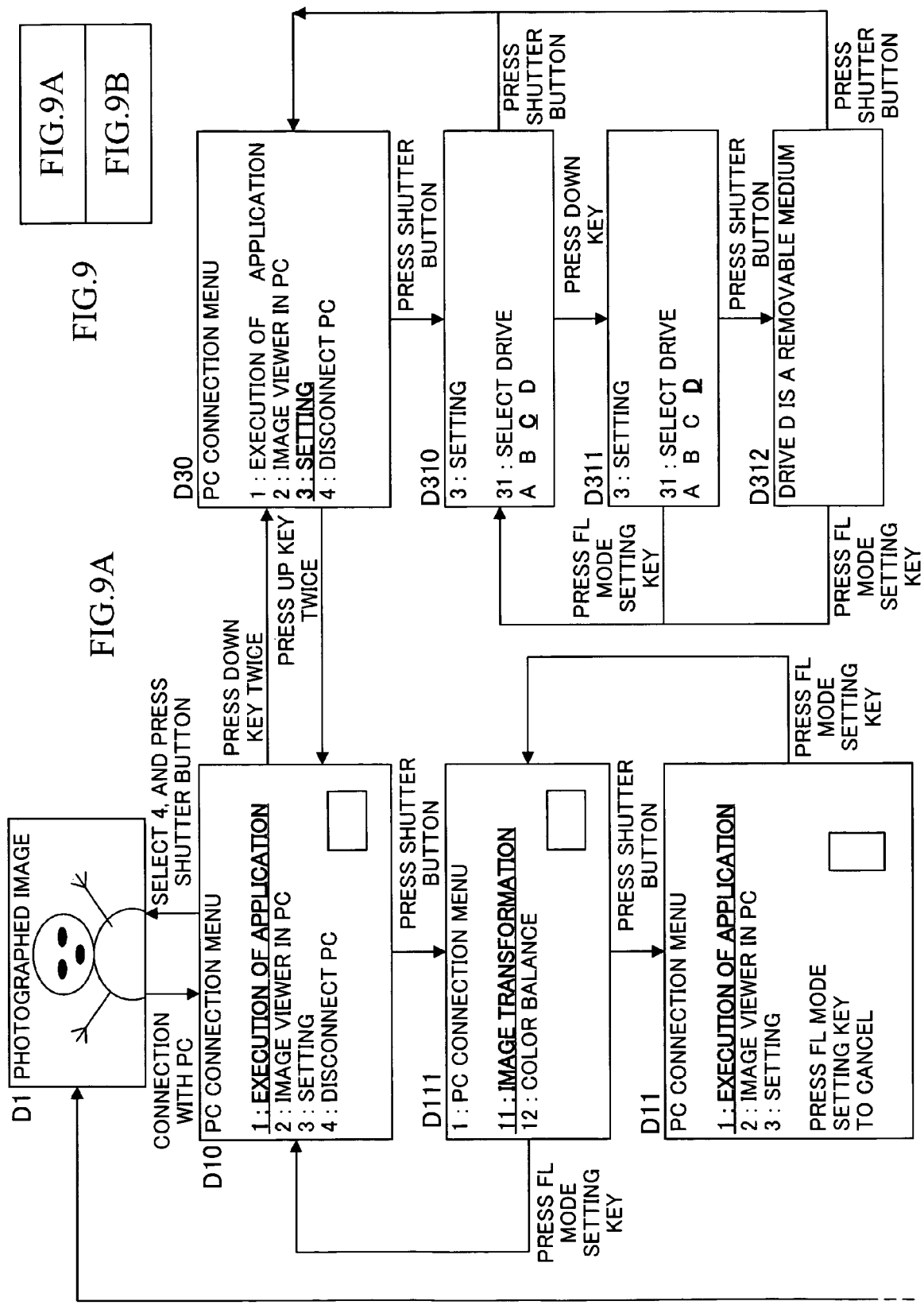
FIG. 9 illustrates transition of the screens displayed on the display of the digital camera.
Figure 9B:
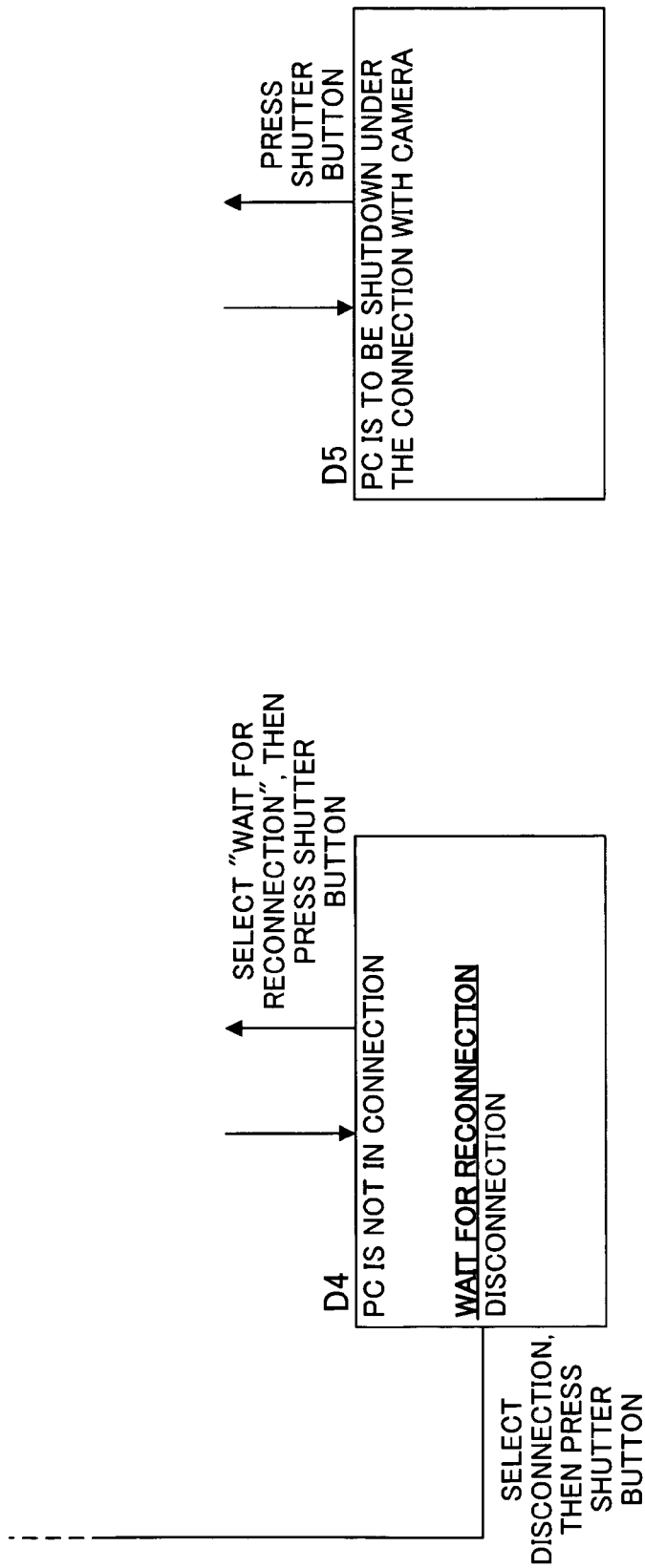

FIG. 9 illustrates transition of screens displayed in the display panel 10 of the digital camera 1.

If the digital camera 1 is not in connection with the PC 1000, the reproduction mode screen D1 can be switched to the photographing mode screen by manipulating the mode change switch 14. In the reproduction mode screen D1, the photographed image of the largest frame number is displayed, while in the photographing mode screen, a live view image is displayed.

Figure 12A:
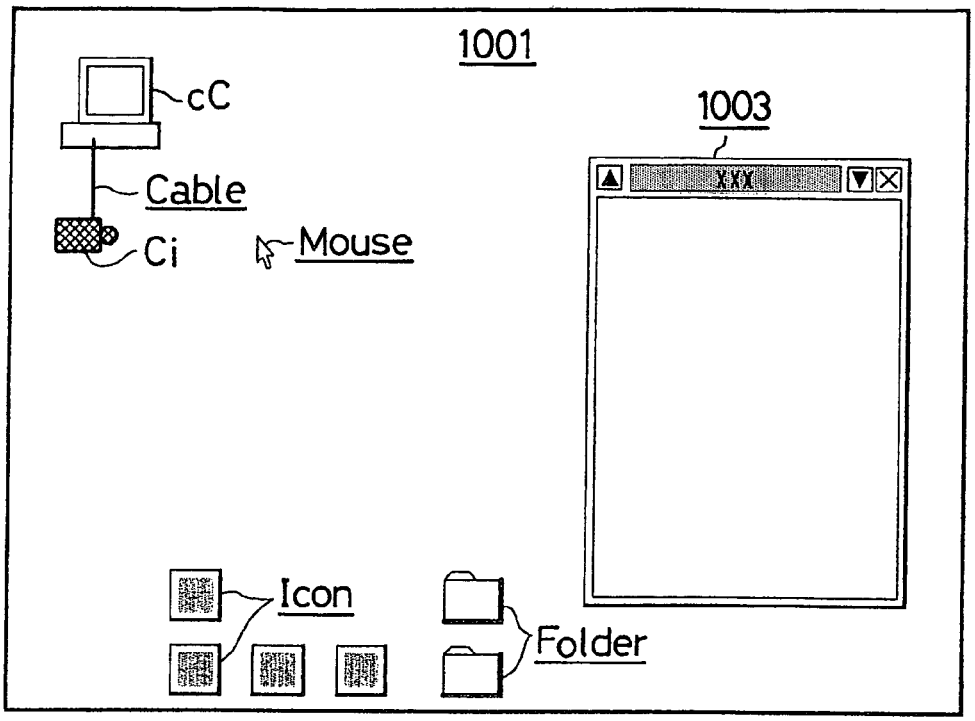
FIG. 12(a) illustrates the monitor screen of the personal computer when the digital camera is connected to the personal computer.

In either mode, if the digital camera 1 is connected to the USB port provided to the keyboard K of the PC 1000, the digital camera connecting application A, which is installed in the hard disc drive HD in the PC 1000 in advance, detects the connection of the digital camera 1, and the screen of the display panel changes to D10. At the same time, an icon ci representing the digital camera 1 is displayed on the monitor screen 1001 of the PC 1000, as shown in FIG. 12(a). Data/application icons (Icon), folder icons (Folder), an icon (cC) representing the PC 1000 itself, and an opened window 1003 are also displayed in the monitor screen 1001. Because the digital camera 1 has been connected to the PC 1000, the PC icon (cC) and the camera icon (ci) are connected via the picture of a cable (Cable) on the monitor screen 1001 of the PC 1000.

In D10 of the digital camera 1, the image data of the largest frame number is displayed in the box located bottom right of the screen D10. A PC connection menu is also displayed in this screen D10, so that the user can select a desired item by pressing the UP key 6 or the DOWN key 7. In this example, "1: execution of application" is selected, which is underlined in D10 shown in FIG. 9. If the shutter button 9 is pressed after the "1: execution of application" has been selected in D10, the screen shifts to D111, in which "1: PC connection menu" is bolded and displayed. In D111, in this example, the item "image transformation" is selected as an operation menu. If the shutter button 9 is pressed in this state, the image transformation is executed, and the lateral image displayed bottom right of D111 is converted into a longitudinal image shown in D11. If, in D111, the FL mode setting key 11 is pressed, the screen returns to D10.

In D11, the rotated image (i.e., the longitudinal image) is displayed bottom right of the screen. If the FL mode setting key 11 is pressed in D11 after the image transformation has been executed, the execution result of the application is cancelled, and the screen returns to D111. Although not shown in figures, if an item is selected by the UP and DOWN keys in D11, and if the shutter button 9 is pressed, the selected item is executed.

If, in D10, the DOWN key 7 is pressed twice under the selection of "1: execution of application", the screen shifts to D30, in which the item "3: setting" which is two lines below the first item is selected. If, in D30, the UP key 6 is pressed twice, then the screen returns to D10.

If, in D30, the shutter button 9 is pressed, the screen shifts to D310, in which the user can select a drive, that is, a recording medium, in the PC 1000. The drive C is selected as default, and the user can select a desired drive by manipulating the UP and DOWN keys. Drive names "A" and "B" are assigned to floppy disk drive, "C" is assigned to hard disc drive, and "D" is assigned to magneto-optic disk drive. The user can select the optimum medium among from the floppy diskette FD, the hard disk drive HD, and the magneto-optic disk MO by selecting one of A through D. For example, if the DOWN key 7 is pressed in D310, the drive D is selected, as shown in screen D311. If the shutter button 9 is pressed in D311 under the selection of the drive D, a warning informing that the drive D is a removable medium is displayed, as shown in D312. If the shutter button 9 is again pressed in spite of the warning, the drive D is actually selected.

If the hard disc drive HD is selected as a recording medium of the PC 1000 used by the digital camera 1, no warning is issued. However, if removable media, such as a floppy diskette and a magneto-optic disk, are selected, a warning is displayed in order to prevent the removable medium from being removed from the PC during the execution of the application. The operating system of the PC 1000 can recognize if the selected drive is removable, and warning is displayed in D312 based on the detection result.

If the shutter button 9 is pressed in D310 and D312, the recording medium to be used is confirmed, and the screen returns to D30. IF the FL mode setting key 11 is pressed in D311 and D312, the screen returns to D310.

If the digital camera 1 is suddenly disconnected form the PC 1000 after the connection has been established, a warning informing the disconnection is displayed, as shown in D4. In D4, default is "wait for reconnecting"; however, the user can select "disconnection" by pressing the DOWN key. If the shutter button 9 is selected after the selection of "disconnection", the screen returns to D1. If the shutter button 9 is pressed after the selection of "wait for reconnecting", the screen returns to the previous screen. The reconnecting process will be described later.

Figure 12B:
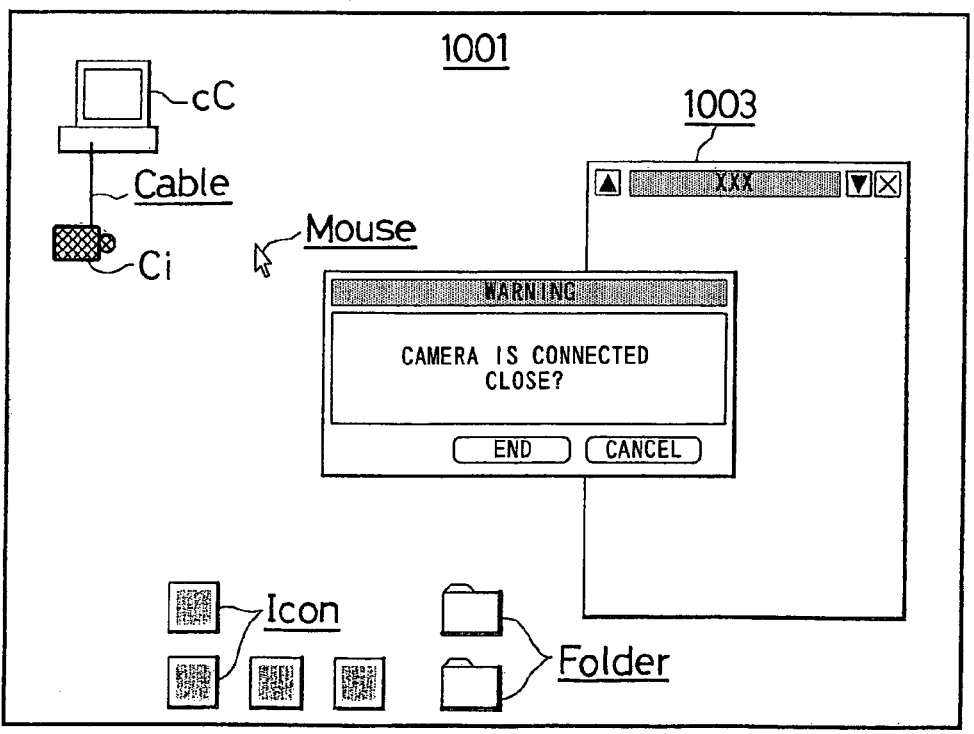
FIG. 12(b) illustrates the monitor screen of the personal computer when the computer is to be shut down.

If the PC 1000 is to close this application, while the digital camera 1 is in connection with the PC 1000, then a warning informing that the PC is to be shut down in the connection state of the digital camera 1 is displayed on the display panel 10 of the digital camera, as show in D5. By this warning, the user can know that the digital camera 1 is now referring to the task region. At this time, a warning dialogue informing that the digital camera 1 is still in connection is also opened in the monitor screen 1001 of the PC 1000, as shown in FIG. 12(*b*). If "shut down" is selected in this dialogue, the PC 1000 is actually shut down. In this case, the screen of the display panel 10 of the digital camera 1 changes to D4. On the other hand, if "cancel" is selected in the warning dialogue on the monitor screen 1001 of the PC 1000, then the shut down command is cancelled. In this case, if the shutter button 9 is pressed after the confirmation of the cancellation of the shut down operation when screen D5 is displayed in the display panel 10 of the digital camera 1, the previous screen immediately before D5 is displayed in the display panel 10 of the digital camera 1.

Figure 10:
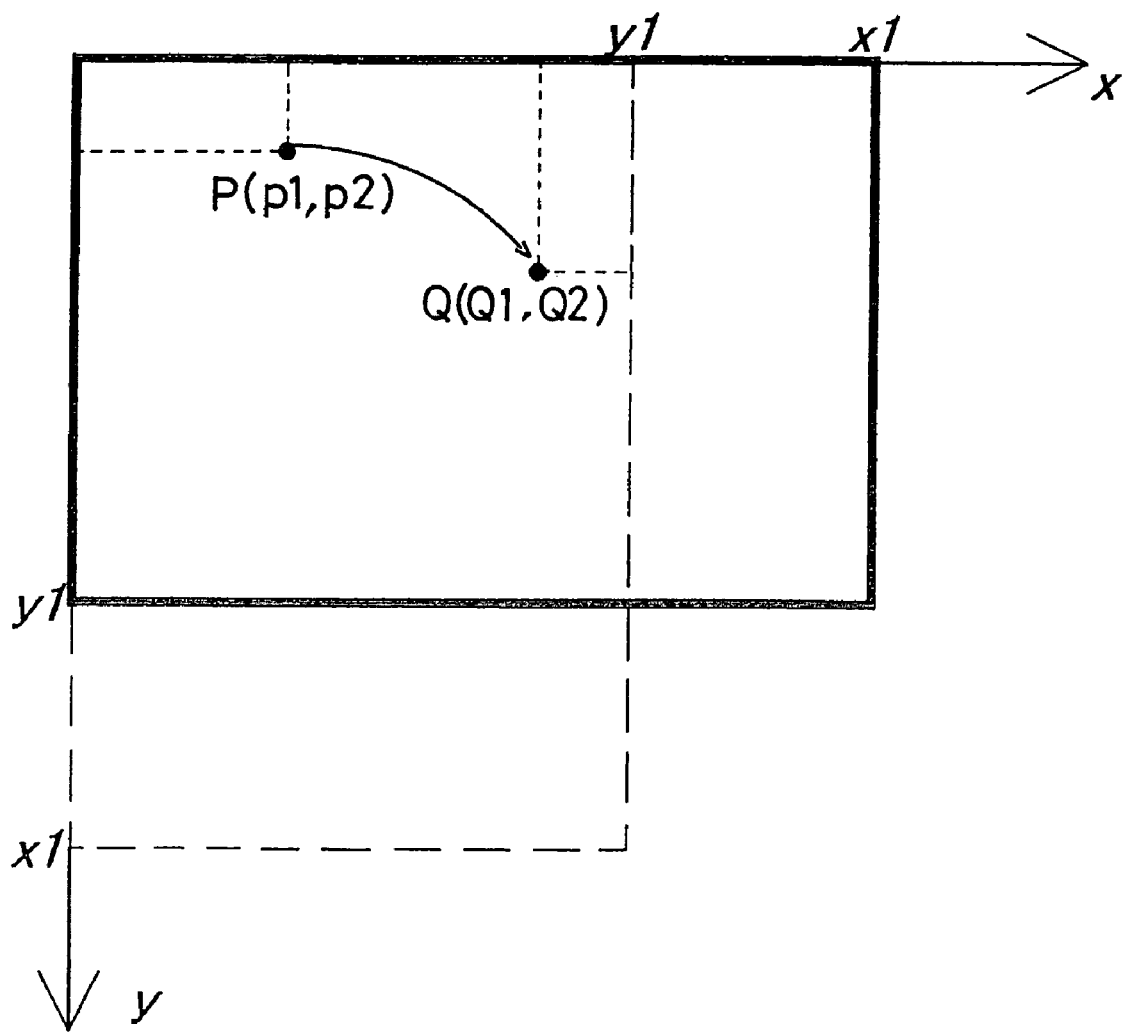
FIG. 10 illustrates image transformation for converting a lateral image to a longitudinal image, which is performed according to the application program of the digital camera.

Next, the image transformation process for converting a lateral image to a longitudinal image executed in D111 will be explained with reference to FIG. 10.

If, in D111, "image transformation" is selected, and if the shutter button 9 is pressed, then the image transformation operation is performed according to the application program stored in the hard disk drive HD of the PC 1000. First, the image data of the displayed frame are successively read out from the memory card 8 of the digital camera 1, and all the data in the memory card 8 are stored in the memory M1 (shown in FIG. 8) of the PC 1000. If the memory M1 is short, the data is stored in the temporary storage region V1 (shown in FIG. 8) in the hard disk drive HD.

Then, the image data stored in the memory M1 or the region V1 of the hard disk drive is read out pixel by pixel in order to execute the image transformation process. In this operation, the coordinates (or the addresses) of the image data are converted from P(p1, p2) to Q(Q1, Q2), as shown in FIG. 10. The transformation algorithm is $$Q1 = y1 - p2$$

$$Q2 = p1$$

This algorithm is repeated to all the pixels included in the region $0 \leq p1 \leq x1$ and $0 \leq p2 \leq y1$, whereby the image transformation, i.e., the lateral to longitudinal conversion, can be completed. The transform Q is stored in another memory region M2 of the PC 1000, or if the memory is short, the transform is stored in the temporary storage region V2 (shown in FIG. 8) in the hard disk drive HD. The transform Q is then read out from the memory region M2 or the temporary storage region V2 of the PC 1000, and is written over the current image data in the memory card 8 of the digital camera 1.

If the image transformation has been cancelled in D11, the original image data is read out from the memory M1 or the temporary storage region V1, and is written over the current to image data in the memory card 8 of the digital camera 1.

In this manner, the user can access to the hard disc drive HD of the PC 1000 from the digital camera 1, and can execute a specific operation on the digital camera side, while referring to various data including the programs recorded in the PC 1000 and using a region created exclusively for the digital camera 1 in the hard disk drive HD. Accordingly, high-performance operations can be achieved without adding an additional large capacity of memory.

Figure 11:
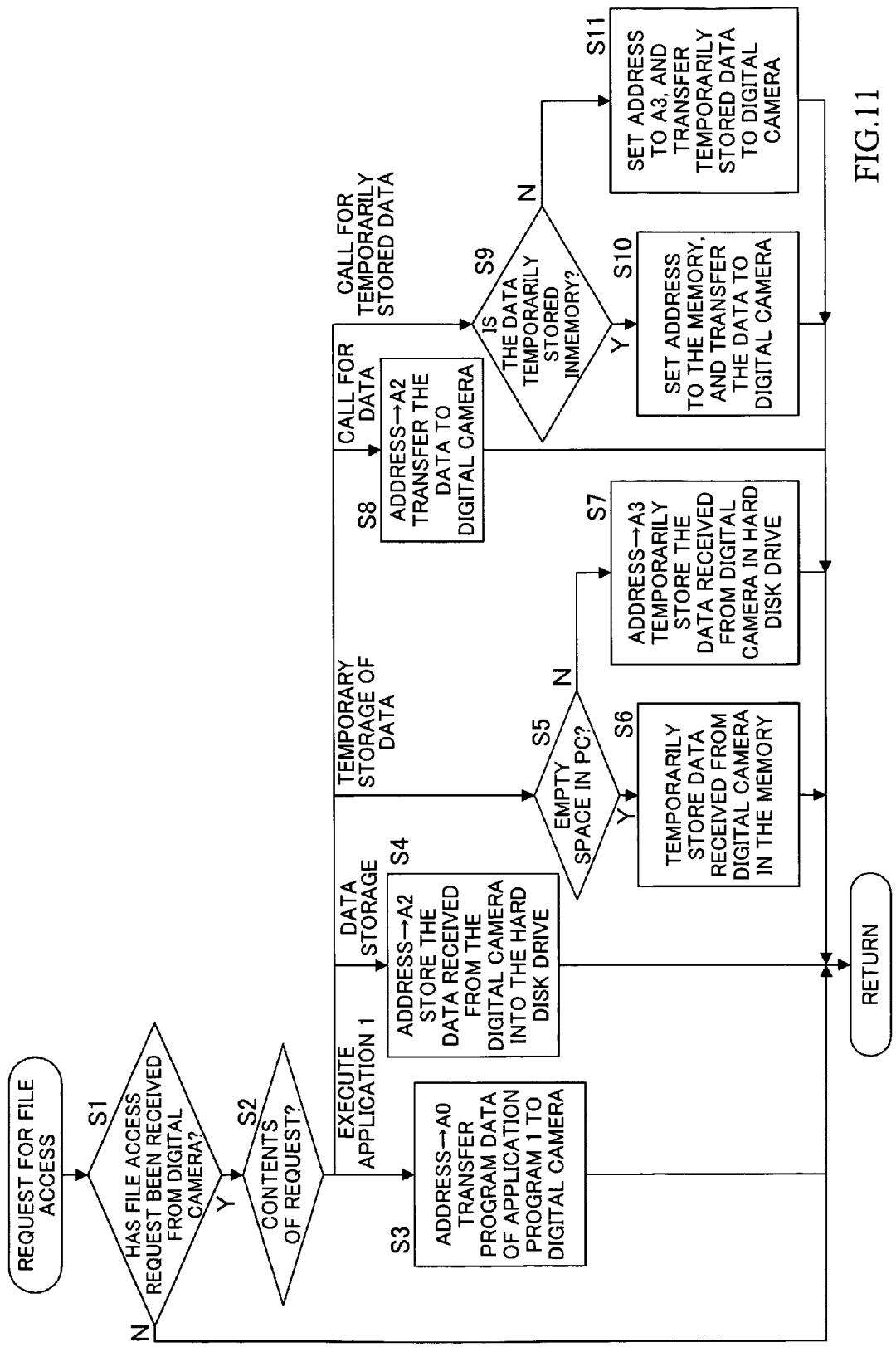
FIG. 11 is a flowchart showing the operations of the connecting application of the personal computer.

In order for the PC 1000 to execute the above-described operations, a digital camera connecting application A is required. FIG. 11 is a flowchart showing the operations of the connecting application A. In the following explanation, Step is abbreviated as "S".

First, if the PC 1000 received a request for accessing a file from the digital camera 1 (YES in S1), an appropriate process is selected according to the request in S2.

If the request is for execution of the application program 1, the address is set to address A0, in which the data of the application program 1 is stored, and the data is successively transferred to the work memory 211M of the general controller 211 of the digital camera 1 in S3. For example, a request for calling the image transformation program is processed in S3.

If the request is for data storage, the process proceeds to S4, in which the address is set to the data storage address A2, and the data received from the digital camera 1 is successively stored in the hard disk drive HD. Although not shown in the flowchart, if the address A2 is partially occupied, then another address is designated taking into account the offset of the data amount stored in A2, and data is stored in the newly designated address.

If the request is for temporary storage of data, the process proceeds to S5, in which it is determined if there is an empty space in the memory of the PC 1000. If there is an empty space, the data is stored in the memory. If there is no space in the memory, the data is stored in the address A3 of the temporary storage region in the hard disk drive HD. If the address A3 is temporarily occupied, then a new address is designated taking into account the offset of the data amount stored in A3. For example, if the region V1 is occupied, then, the region V2 which starts from the next address is designated.

If the request is for calling for the PC data, the process proceeds to S8, in which the address is set to A2 through A3-1 in which the requested data is stored, and the data is transferred to the digital camera.

If the request is for calling for the temporarily stored data, the process proceeds to S9, and the medium in which the requested data is temporarily stored is determined. If the medium is the memory (YES in S9), the address is set to the determined memory, and the temporarily stored data is transferred to the digital camera 1 in S10. If the medium is the hard disk drive (NO in S9), the address is set to A3 or after, and the temporarily stored data is transferred to the digital camera 1. For example, if the user wants to cancel the image transformation which was already executed, this step is performed.

Figure 13:
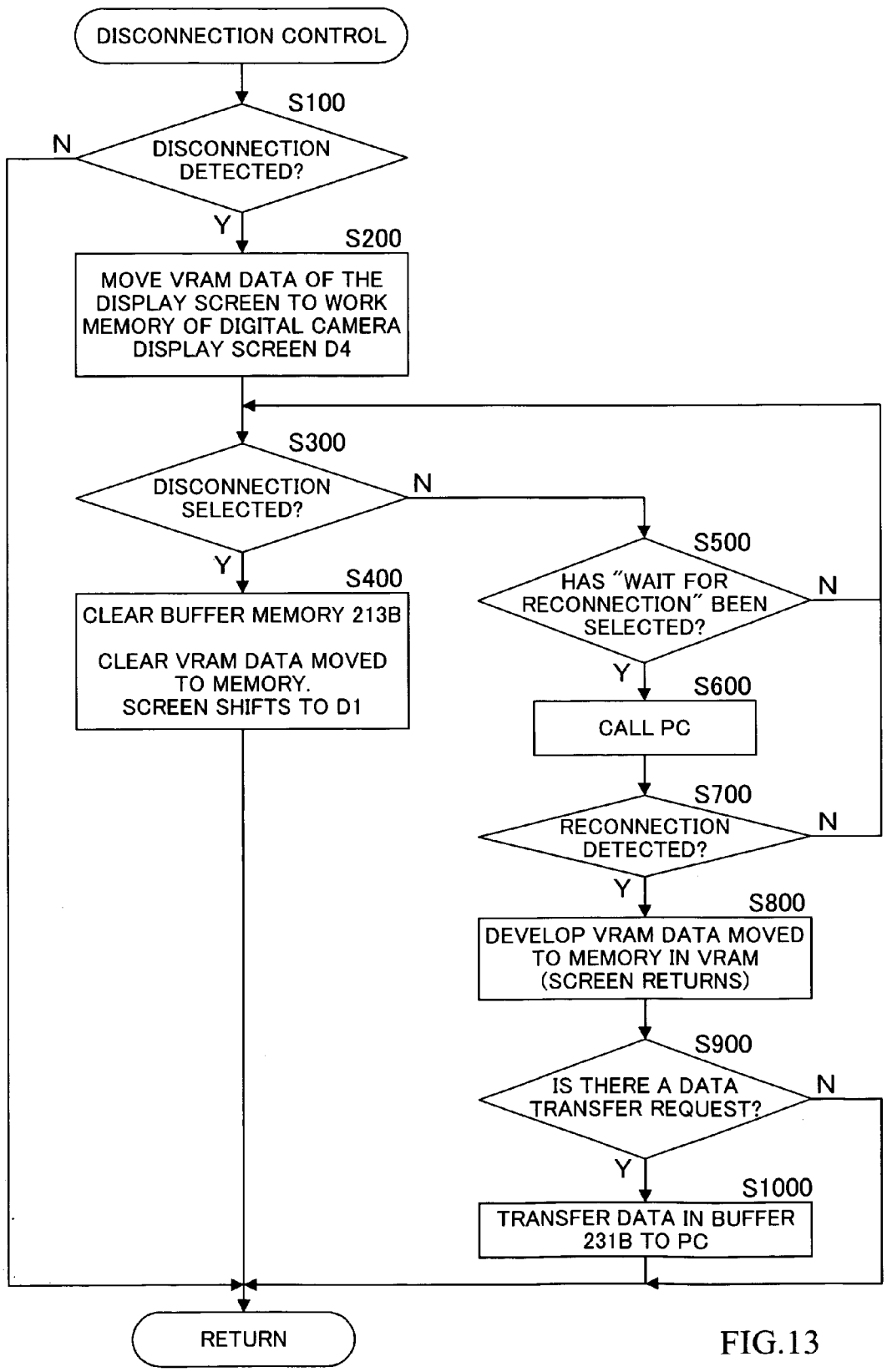
FIG. 13 is a flowchart showing the operations performed when the digital camera is disconnected from and reconnected to the personal computer.

Next, the control operations performed when the digital camera 1 is disconnected from and reconnected to the PC 1000 will be explained with reference to FIG. 13.

If in S100 disconnection of the digital camera 1 from the PC 1000 is detected (YES in S100), the VRAM data displayed in the display panel 10 of the digital camera 1 is moved to the work memory 211M of the general controller 211 of the digital camera 1, and screen D4 is displayed on the display panel 10 in S200.

In S300, it is determined if "disconnection" has been selected in screen D4, and if the shutter button has been pressed. If the shutter button was pressed (YES in S300), the data in the buffer memory 213B and the VRAM data moved to the memory of the digital camera 1 are deleted in S40. Then, the screen shifts to D1, and this routine terminates. In this manner, whenever the disconnection of the digital camera from the PC is requested, the buffer memory 213B is cleared in order to prevent unnecessary data from remaining in the buffer and disturbing the reconnecting operation.

On the other hand, if in S300 "disconnection" is not selected in screen D4 (NO in S300), the process proceeds to S500, in which it is determined if "wait for reconnecting" has been selected in D4, and if the shutter button 9 has been pressed after the selection. If the shutter button 9 was pressed (YES in S500), the PC 1000 is called in S600, and it is determined in S700 if reconnection has been detected. If the shutter button 9 was not pressed (NO in S500), or if the reconnection was not detected (NO in S700), the process returns to S300.

If reconnection was detected in S700 (YES in S700) after the PC had been called, then the VRAM data which was moved to the memory of the digital camera 1 is developed in the VRAM, and the screen returns. Then, in S900, it is determined if there is a data transfer request transmitted from the PC 1000. If there is a request (YES in S900), the data in the buffer memory 213B is transferred to the PC 1000 in S1000, and this process terminates. Thus, in response to the data transfer request generated after the reconnection, the data stored in the buffer memory 213B is transmitted to the PC 1000. Since it is not necessary to repeat the data transfer process from the beginning, the process is simplified, and the process time can be reduced.

If there is no data transfer request (NO in S900), the process also terminates.

Although, in this embodiment, the hard disk drive HD of the PC 1000 is used to execute data processing for the digital camera 1, a magneto-optic disk or the like may be used in the same manner.

With this image processing system, the user can access from the digital camera to a prescribed region created in the recording medium of the computer, and can refer to the data stored in that region. The user can make use of this region in order to execute a specific process for the digital camera 1. In other words, data processing for the digital camera 1 can be performed using the source (e.g., the recording medium) of the computer, and therefore, it is not necessary to add a large capacity of memory to the digital camera 1. High-performance operations generally requiring large sources can be performed with limited sources.

Since the application program which is executable by the digital camera is stored in the above-described region, the digital camera can process data according to this application program.

If the computer is to be shut down during the access to the above-described region from the digital camera, a warning is displayed in order to inform the user of the current accessing state by the digital camera, and to prevent the computer form being shut down by error during the execution of the application by the digital camera.

The data buffer means provided to the connection interface of the digital camera allows the data which is to be transmitted from the digital camera to the computer to be temporarily stored. This temporarily stored data can be used, for example, when the digital camera is reconnected to the computer after a disconnection has been made. In this case, the user does not have to repeat the data transfer process from the beginning. Thus, the process is simplified with reduced process time.

This data temporarily stored in the data buffer means is deleted when a disconnection command for disconnecting the digital camera from the computer is issued, in order to prevent unnecessary data from remaining in the buffer and disturbing the reconnecting operation.

The digital camera has an execution means for executing the application program using a task region created in the recording medium of the computer. This task region formed in the computer is only temporarily used by the digital camera. Since the digital camera can make use of the source of the computer, high-performance operations can be achieved by the digital camera without adding a large capacity of memory to the camera.

In addition, the user can select the optimum recording medium for creating the task region, which is suitably used to execute the application program, through the selection means.

If the user selects a removable recording medium for the creation of the task region, a warning is displayed in order to prevent this recording medium from being unwillingly removed, whereby possibilities of system breakdown can be prevented in advance.

Since the digital camera can use the recording medium which is connected to the computer and stores the application program executable by the digital camera, the digital camera does not need a large capacity of memory. The digital camera can make use of the sources of the computer to execute this application program.

Although the present invention has been described based on the preferred embodiment, the terms and the sentences used in this specification are explanatory, and not limiting the present invention. It should be appreciated that there are many modifications and substitutions without departing from the spirit and scope of the present invention.

What is claimed is:

1. An image processing system, comprising:
a photographing apparatus and an image processing apparatus to which said photographing apparatus and a recording medium can be connected;
wherein said photographing apparatus comprises a controller for executing a program stored in said recording medium,
and wherein said image processing apparatus comprises a processor for creating a region accessible from said photographing apparatus, and a controller for causing the program to be stored in the region, and further including
an indicator for issuing a warning when said image processing apparatus is to be shut down during the access by the photographing apparatus to the region created in said recording medium.

2. The image processing system according to claim 1, wherein said photographing apparatus further comprises an interface for connecting itself to said image processing apparatus, and a buffer memory is provided to said interface.

3. The image processing system according to claim 2, wherein if said photographing apparatus is reconnected to said image processing apparatus after disconnection, a reconnecting process is performed using data stored in said buffer memory.

4. The image processing system according to claim 2, wherein said photographing apparatus deletes data stored in said buffer memory when said photographing apparatus is disconnected from said image processing apparatus.

5. A photographing apparatus, comprising:
an image sensor;
a removable memory card for recording image data taken by said image sensor, wherein said removable memory card is attachable to and detachable from said photographing apparatus;
an interface for reading, from an external recording medium, a program for processing the image data recorded in said removable memory card; and
a controller for executing the program read out from the external recording medium while using a temporary task region in said external recording medium.

6. The photographing apparatus according to claim 5, wherein said interface is used to connect said photographing apparatus to an image processing apparatus with which the external recording medium is in connection.

7. The photographing apparatus according to claim 6, wherein the image data is processed by the image processing apparatus.

8. An image processing system including a photographing apparatus, and an image processing apparatus to which said photographing apparatus and a recording medium can be connected,
wherein said photographing apparatus comprises a controller for executing a program recorded in the recording medium connected to said image processing apparatus; and
wherein said image processing apparatus comprises a processor for creating a task region in the recording medium, the task region being temporarily used to execute the program.

9. The image processing system according to claim 8, wherein a plurality of recording media can be connected to the image processing apparatus, and wherein said photographing apparatus further comprises a selector for selecting a recording medium among from said plurality of recording media in order to create the task region in the recording medium.

10. The image processing system according to claim 9, wherein said photographing apparatus displays a warning when a removable recording medium is selected by said selector.

11. A method for formatting a recording medium by an image processing apparatus, the method including the steps of:
creating a first region for storing a first program in the recording medium, the first program being executable by a photographing apparatus when connected to the image processing apparatus;
creating a second region for storing a second program in the recording medium; and
creating a third region in the recording medium, the third region being temporarily used as a task region during the execution of the first program.

12. The method of claim 11, further comprising:
detecting a connection of said photographing apparatus to said image processing apparatus, wherein said detection causes said image processing apparatus to initiate said formatting.

13. The method of claim 11, wherein said image processing apparatus is a computer.

14. A program product on a storage executable by a computer, the program product creating:
a first region for storing a first program to be created in a recording medium provided in the computer, the first program being executed by a photographing apparatus;
a second region for storing a second program to be created in the recording medium; and
a third region to be created in the recording medium, the third region being temporarily used as a task region during the execution of the first program.

15. In an image processing system including a computer and a photographing apparatus connectable to the computer, the computer being connectable to a recording medium storing a program executable by the photographic apparatus, a method of formatting the recording medium, comprising:
creating a first region in the recording medium;
storing in the first region a program dedicated for execution by the photographing apparatus;
creating a second region in the recording medium;
storing in the second region a second program for execution by the photographing apparatus; and
creating a third region in the recording medium, the third region being temporarily used as a task region during execution of the program by the photographing apparatus.

* * * * *